US010830641B2

(12) United States Patent
Mai et al.

(10) Patent No.: US 10,830,641 B2
(45) Date of Patent: Nov. 10, 2020

(54) COMPACT SPECTROMETER HAVING REFLECTIVE WEDGE STRUCTURE

(71) Applicant: Hong Kong Applied Science and Technology Research Institute Co., Ltd., Shatin (HK)

(72) Inventors: Jiangquan Mai, Shatin (HK); Wai Yi Yeung, Kowloon (HK); Siddharth Arunkumar Agrawal, Kennedy Mansion (HK); Chun Zhang, Tai Hang (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 237 days.

(21) Appl. No.: 16/037,855

(22) Filed: Jul. 17, 2018

(65) Prior Publication Data

US 2020/0025611 A1    Jan. 23, 2020

(51) Int. Cl.
*G01J 3/02* (2006.01)
*G01N 21/25* (2006.01)
(Continued)

(52) U.S. Cl.
CPC .......... *G01J 3/0259* (2013.01); *G01J 3/0264* (2013.01); *G01J 3/26* (2013.01); *G01J 3/45* (2013.01); *G01N 21/255* (2013.01)

(58) Field of Classification Search
CPC .... G01J 3/0259; G01J 3/45; G01J 3/14; G01J 3/0264; G01J 3/2823; G01J 3/0289; G01J 3/0208; G01N 21/23; G01N 2021/1793
(Continued)

(56) References Cited

U.S. PATENT DOCUMENTS 5,444,532 A * 8/1995 Sueyoshi ........... G01B 9/02003
                                                    356/487
7,420,663 B2    9/2008 Wang et al.
(Continued)

FOREIGN PATENT DOCUMENTS

CN      101806625 A    8/2010
CN      103267574 A    8/2013
(Continued)

OTHER PUBLICATIONS

Wang, W. et al. "A Monolithic Michelson Interferometer with a Large Piston MEMS Micromirror," 2016 International Conference on Optical MEMS and Nanophotonics (OMN), 2016, 2 pages.
(Continued)

*Primary Examiner* — Sunghee Y Gray
(74) *Attorney, Agent, or Firm* — Norton Rose Fulbright US LLP

(57) ABSTRACT

Systems and methods which provide a compact spectrometer using static Fourier transform interferometer (SFTI) cube configurations, such as are suitable for use with respect to mobile and portable electronic devices, are described. A SFTI cube of embodiments comprises a monolithic dual mirrored wedge beam splitter structure wherein mirrored wedge surfaces provide two reflective mirrors that are slightly tilted away from the orthogonal directions so that the resultant beams of light cross over one another and form an interference pattern. SFTI cube implementations of embodiments facilitate highly compact spectrometer configurations having a wide wavelength range, high resolution, high throughput, and low cost.

43 Claims, 15 Drawing Sheets

(51) Int. Cl.
*G01J 3/45* (2006.01)
*G01J 3/26* (2006.01)

(58) Field of Classification Search
USPC ........ 356/479, 498, 496, 492, 499, 512, 519
See application file for complete search history.

(56) References Cited

U.S. PATENT DOCUMENTS

| | | | |
|---|---|---|---|
| 7,474,405 | B2 | 1/2009 | Kranz et al. |
| 8,654,347 | B2 | 2/2014 | Antila et al. |
| 8,861,086 | B2 | 10/2014 | Liu et al. |
| 9,185,200 | B2 | 11/2015 | Cunningham |
| 9,360,366 | B1 | 6/2016 | Tran |
| 2010/0110545 | A1* | 5/2010 | Hayashi ............... G02B 5/124 |
| | | | 359/530 |
| 2011/0032530 | A1 | 2/2011 | Buisset et al. |
| 2013/0107270 | A1 | 5/2013 | Stroganov et al. |
| 2013/0114062 | A1* | 5/2013 | Liesener ............... H01L 21/681 |
| | | | 355/72 |
| 2014/0320852 | A1 | 10/2014 | Kruizinga et al. |
| 2016/0102999 | A1* | 4/2016 | Liesener ............... G01D 5/266 |
| | | | 356/488 |
| 2016/0143539 | A1* | 5/2016 | Koerner ............... A61B 5/0066 |
| | | | 600/427 |
| 2016/0146722 | A1* | 5/2016 | Koerner ............... G01B 9/02091 |
| | | | 356/301 |
| 2018/0128653 | A1* | 5/2018 | Goodwin ............. G03F 7/70775 |

FOREIGN PATENT DOCUMENTS

| | | |
|---|---|---|
| CN | 103471724 A | 12/2013 |
| CN | 105486407 A | 4/2016 |
| CN | 107949776 A | 4/2018 |

OTHER PUBLICATIONS

Murty, M. V. R. K. "A Compact Lateral Shearing Interferometer Based on the Michelson Interferometer," Appl. Opt., vol. 9, pp. 1146-1148 (1970), 3 pages.

Smith, Z. J. et al. "Cell-Phone-Based Platform for Biomedical Device Development and Education Applications," PLoS ONE 6(3): e17150, 2011, 11 pages.

International Search Report and Written Opinion issued for PCT application No. PCT/CN2018/098575, dated Apr. 18, 2019, 12 pages.

Zhao, J. et al. "A Method to Improve Spectral Resolution for the Static Fourier Interferometer," Acta Photonica Sinica, vol. 39, No. 12, Dec. 2010, 5 pages.

* cited by examiner

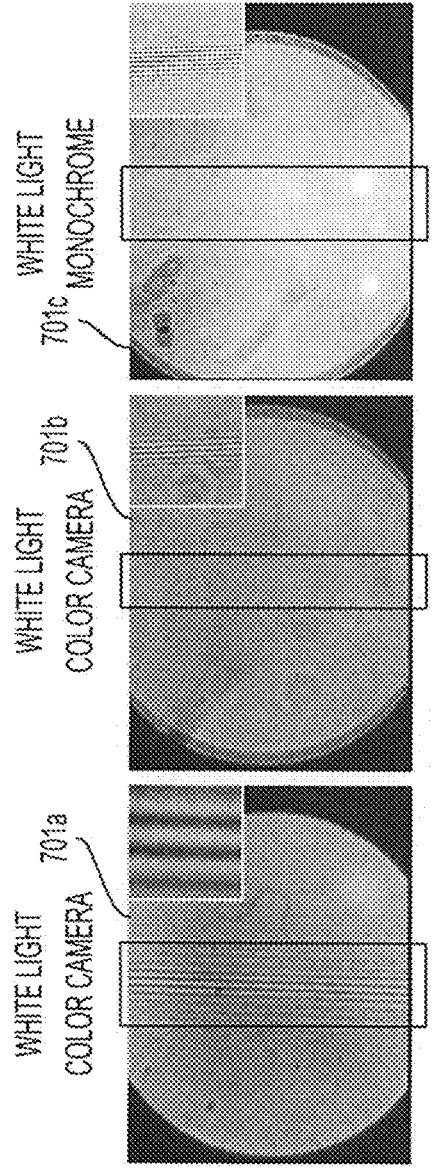
FIG. 7C
FIG. 7B
FIG. 7A
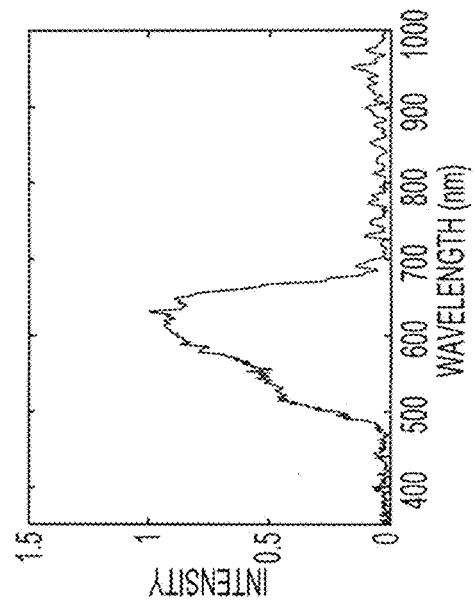
FIG. 7E
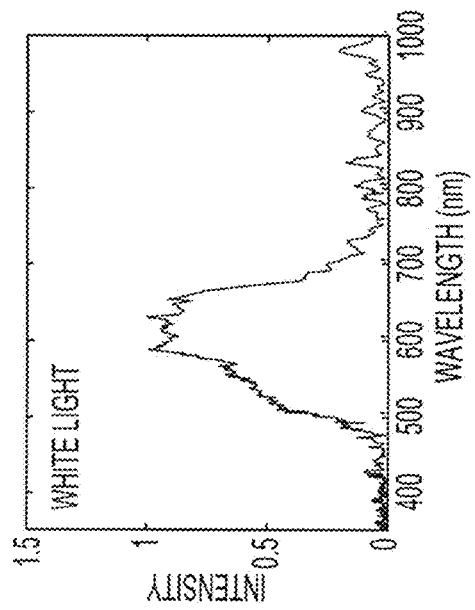
FIG. 7D

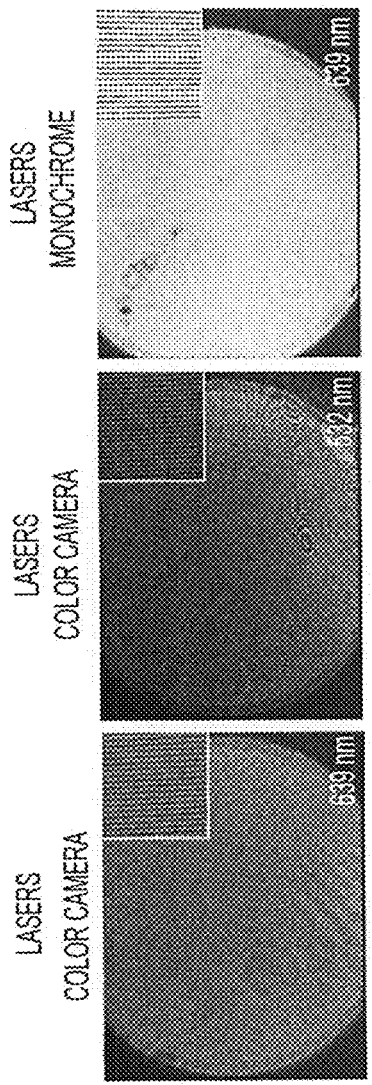
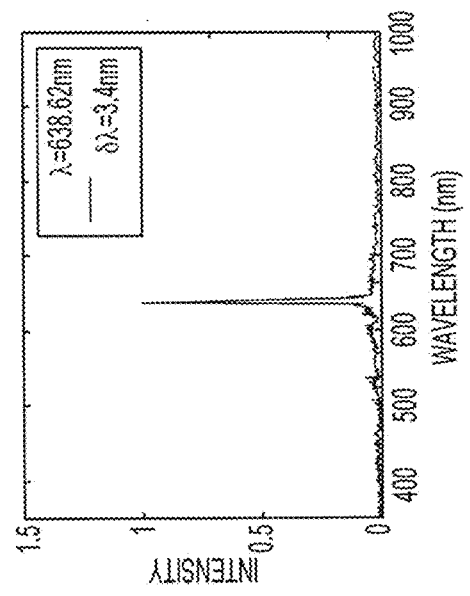
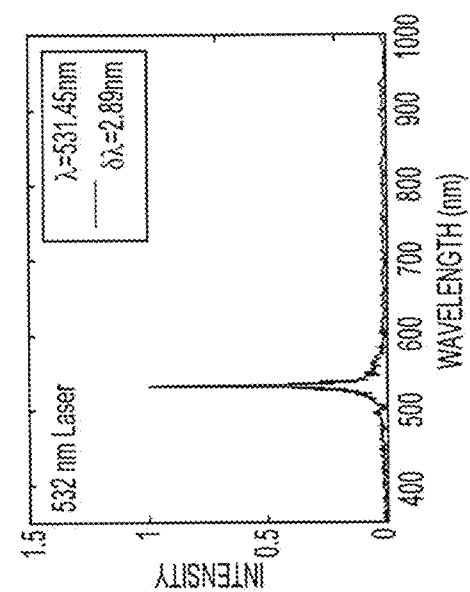
FIG. 8A  FIG. 8B  FIG. 8C  FIG. 8D  FIG. 8E

US 10,830,641 B2

COMPACT SPECTROMETER HAVING REFLECTIVE WEDGE STRUCTURE

TECHNICAL FIELD

The invention relates generally to techniques optical spectrometers and, more particularly, to compact spectrometer configurations having a reflective wedge structure suitable for use with respect to mobile and portable electronic devices.

BACKGROUND OF THE INVENTION

Spectrometers are used to separate and measure spectral components of light. For example, a spectrometer can separate white light and measure individual narrow bands of color (i.e., spectrum). Such spectrometers facilitate spectroscopy capability, such as may be used in chemical analysis to identify chemical compositions. Accordingly, spectrometers have found widespread uses, such as in food safety and quality control, healthcare and medicine, material sciences, astronomy, etc.

Spectrometers have evolved from relatively large, self-contained devices (e.g., a unit size of 175 mm×110 mm×44 mm, having an operational wavelength range of 200-1100 nm, and providing resolution of 0.05-20 nm) to more compact, mini-spectrometer configurations (e.g., a unit size of 12 mm×20 mm×10 mm, having an operational wavelength range of 340-780 nm, and providing resolution of 15 nm). More recently spectrometers have been implemented as smartphone external accessories (e.g., an attachable accessory size of 55 mm×20 mm×20 mm, having an operational wavelength range of 380-750 nm, and providing resolution of 10 nm). The spectrometers of all such form factors have generally suffered from one or more disadvantages, such as relatively large dimensions, low stability, low resolution, narrow wavelength range, etc.

The configurations heretofore used in implementing smartphone spectrometer external accessories, for example, have been very large when compared to the size of the host smartphone and have required delicate and complicated collimators, grating, and/or filter apparatuses. The existing smartphone-based spectrometers, in addition to being bulky in dimension, generally provide low resolution and narrow measurement wavelength range. As examples, the smartphone-based spectrometers of U.S. Pat. Nos. 7,420,663, 8,861,086, and 9,185,200 and the smartphone-based spectrometer described in PLOS One Journal e17150, Mar. 2, 2011 all implement complicated grating structures. The smartphone-based spectrometer of the above mentioned U.S. Pat. No. 9,185,200 and the smartphone-based spectrometer described in the above mentioned PLOS One Journal further implement complicated collimation systems. In an alternative configuration to grating implementations, the smartphone-based spectrometer of U.S. Pat. No. 8,654,347 implements a complicated Fabry-Perot filter configuration. In addition, another configuration based on conventional Michelson interferometer in the cellphone-based spectrometer of U.S. Pat. No. 8,086,266 comprises moving and separated mechanical parts and complicated microelectromechanical systems which requires extra power supplied from the phone. The foregoing spectrometer configurations require moving and/or separated mechanical parts in their designs that greatly affect the accuracy of spectrum measurement (e.g., during operation, external vibrations influence the steadiness of the reflectors movement that limits ability of using those spectrometers under conditions of strong vibrations). In addition to the low vibration stability, existing spectrometers usable on a smartphone platform using grating or filter configuration suffer large size, low resolution, low throughput, and/or narrow wavelength ranges.

BRIEF SUMMARY OF THE INVENTION

The present invention is directed to systems and methods which provide static Fourier transform interferometer (SFTI) compact spectrometer configurations comprising a SFTI cube structure. The SFTI cube structure implemented in accordance with embodiments of a SFTI compact spectrometer eliminates or avoids the need for grating, collimator, and filter structures common to prior spectrometers. Moreover, SFTI cube implementations of embodiments facilitate highly compact spectrometer configurations having a wide wavelength range, high resolution, high throughput, and low cost in accordance with concepts of the present invention.

The SFTI cube of a SFTI compact spectrometer of embodiments of the invention comprises a dual wedge beam splitter structure. A SFTI cube may, for example, comprise mirrored wedge surfaces disposed at two output surfaces of a beam splitter. The mirrored wedge surfaces of a SFTI cube according to embodiments provide two reflective mirrors that are slightly tilted away from a respective orthogonal cube face (referred to herein as tilted away from orthogonal directions) so that the resultant beams of light cross over one another and form an interference pattern.

A SFTI cube of embodiments may be provided as a monolithic structure, such as may comprise optical glass. For example, a wedge providing a wedge surface of the dual mirrored wedge surfaces may be formed in the monolithic material of the cube structure (e.g., one or more wedges removed from an otherwise cube of optical glass, wherein a remaining surface of the wedge is mirrored). Additionally or alternatively, a wedge providing a mirrored wedge surface of the dual wedge surfaces may be formed on a portion of the monolithic material of the cube structure (e.g., one or more wedges of optical glass added to an otherwise cube of optical glass, wherein a surface of the added wedge is mirrored). In accordance with embodiments, a combination of a wedge surface formed in the monolithic material and a surface of a wedge formed on the monolithic material may be utilized to provide the dual mirrored wedge surfaces of a SFTI cube of a SFTI compact spectrometer of embodiments of the invention.

Irrespective of the particular implementation of the wedge surfaces, monolithic implementations of SFTI cubes of embodiments herein facilitate compact and highly stable spectrometer configurations in accordance with concepts of the present invention. For example, a SFTI cube implemented as a monolithic structure in accordance with concepts of the present invention, in addition to being compact in size, eliminates movable optical components (e.g., moving mirrors) as well as separate mirror structures, thus solving vibration stability issues. Additionally, the SFTI structure of embodiments secures the location of the zero optical path difference (ZOPD) in the field of view enabling the observation of fringes of broadband light sources which is essential for excellent spectrum detection performance.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIGS. 7A-7E and 8A-8E show experimental results from the SFTI cube implementation of FIG. 6.

DETAILED DESCRIPTION OF THE INVENTION

Figure 1:
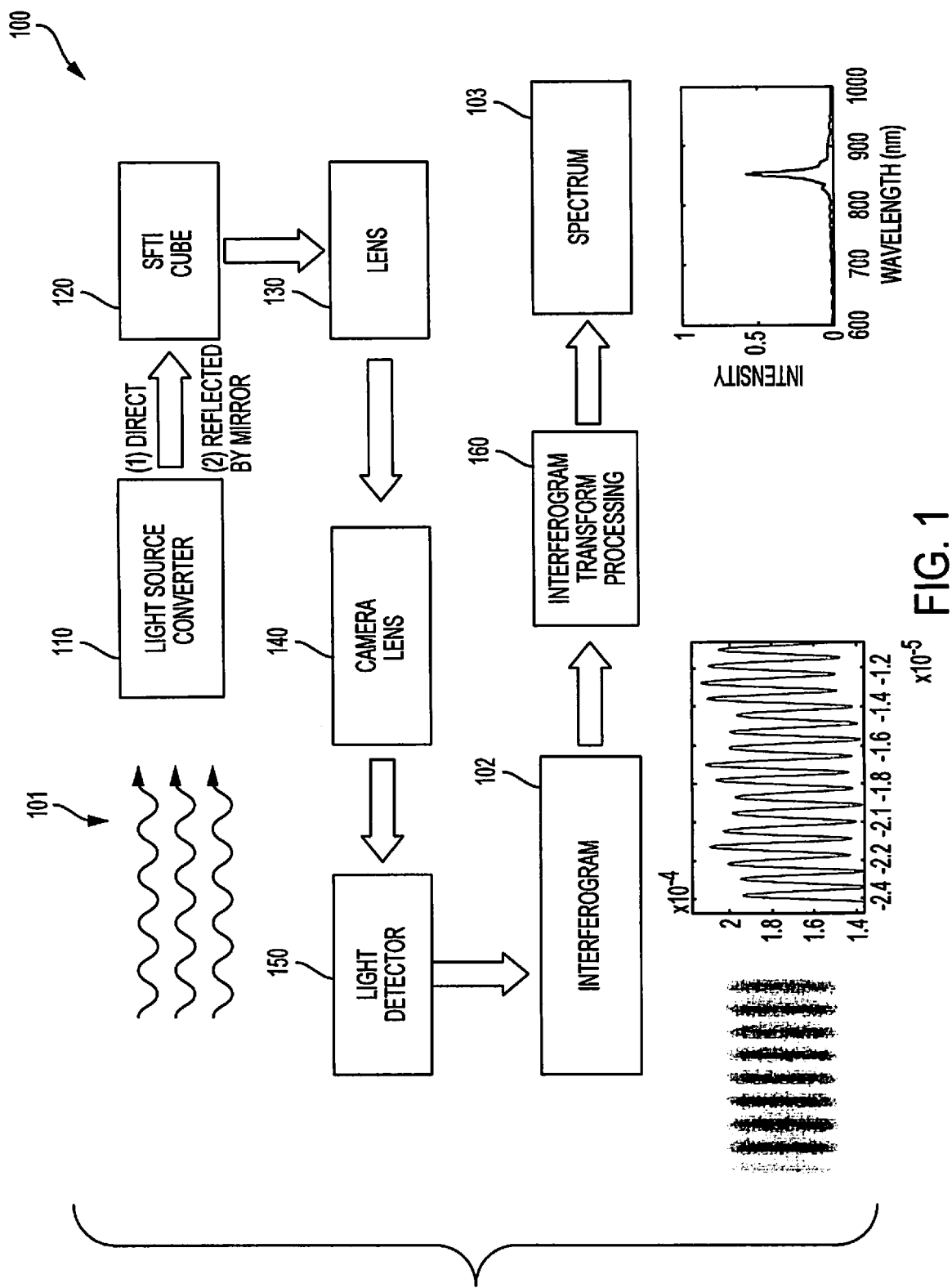
FIG. 1 shows a functional block diagram of a static Fourier transform interferometer (SFTI) compact spectrometer comprising a SFTI cube structure in accordance with embodiments of the present invention.

FIG. 1 shows a functional block diagram of static Fourier transform interferometer (SFTI) compact spectrometer configurations comprising a SFTI cube structure implemented in accordance with embodiments of the present invention. SFTI compact spectrometer 100 of the embodiment illustrated in FIG. 1 includes light source converter 110, SFTI cube 120, lenses 130 and 140, light detector 150, and interferogram transform processing logic 160 operable in cooperation to provide a facilitate highly compact spectrometer configuration having a wide wavelength range, high resolution, high throughput, and low cost.

In operation of embodiments of SFTI compact spectrometer 100, light source converter 110 directs incident light 101 (e.g., light emitted by and/or reflected from a sample, not shown, for which spectroscopy is to be performed) to SFTI cube 120. In operation according to embodiments, light source converter 110 converts incident light to either point source or parallel source. Light source converter 110 of embodiments may, for example, provide point source conversion with respect to incident light 101 provided to SFTI cube 120. Examples of a light source converter implementation for converting incident light to point source include a lens, a slit, a pinhole, and an optical fiber connector. Examples of a light source converter implementation for converting incident light to parallel source include a collimator.

SFTI cube 120 of embodiments provides a dual wedge beam splitter structure comprising mirrored wedge surfaces disposed at two output surfaces of a beam splitter. SFTI cube 120 is preferably provided as a monolithic structure, such comprising a monolithic structure of optical glass (e.g., BK7 optical glass) or other suitable optical material (e.g., fused quartz, fused silica, optical grade plastic, etc.). As will be better understood from the description below, the mirrored wedge surfaces of embodiments of SFTI cube 120 provide two reflective mirrors that are slightly tilted away from orthogonal directions so that the resultant beams of light cross over one another and form an interference pattern. Accordingly, SFTI cube 120 of embodiments outputs light in the form of an interference pattern to downstream components of SFTI compact spectrometer 100.

Lenses 130 and 140 of embodiments focus the interference pattern light output by SFTI cube 120 on an imaging surface of light detector 150. It should be appreciated that, although two lenses are shown in the illustrated embodiment of SFTI compact spectrometer 100, a greater or lesser number of lenses may be utilized. For example, as will be better understood from the discussion below, where the SFTI compact spectrometer is provided in an external accessory configuration (e.g., an accessory attachable to a device such as a digital camera, a smartphone, a personal digital assistant (PDA), a tablet device, a notebook computer, etc.) for cooperative operation with an image capture device (e.g., host device digital camera) having one or more lenses (e.g., lens 140), an additional lens (e.g., lens 130) configured to optimize the light output by SFTI cube 120 for capture by light detector 150. Alternatively, where the SFTI compact spectrometer is provided in a unit comprising an image capture device (e.g., an internal digital camera), lenses 130 and 140 may be combined to comprise a single lens configured to optimize the light output by SFTI cube 120 for capture by light detector 150.

Light detector 150 of embodiments comprises a light sensor array operable to capture the interference pattern light output by SFTI cube 120 for providing an interferogram (e.g., interferogram 102). Light detector 150 may comprise a complementary metal-oxide-semiconductor (CMOS) image sensor, a charge coupled device (CCD) image sensor, or other sensor array technology suitable for capturing interferograms in accordance with the concepts of the present invention. It should be appreciated that light detector 150 may be provided in various configurations, such as may be configured for capturing color images, for capturing black and white images, for capturing non-visible light (e.g., infrared, near infrared, and/or ultraviolet) images, etc. Additionally or alternatively, light detector 150 of embodiments may comprise a sensor array of a host device (e.g., digital camera sensor of a digital camera, smartphone, PDA, tablet device, notebook computer, etc. of an external accessory configuration of SFTI compact spectrometer 100, a dedicated sensor array (e.g., embedded sensor array of a SFTI compact spectrometer comprising an image capture device), etc. In an embodiment where a both color and monochrome light sensors are available (e.g., a host smartphone configuration, such as the Huawei P10, having both color and monochrome cameras), preferred embodiments may utilize the monochrome light detector as the spectrometer detector because, without a Bayer filter (RGB color filter array), the monochrome light detector will typically have higher throughput, higher spatial resolution, and more accurate light intensity detection.

Interferogram transform processing logic 160 of embodiments comprises logic configured to transform the interferograms provided by light detector 150 into the corresponding spectrum data (e.g., spectrum data 103). Interferogram transform processing logic 160 may, for example, comprise code (e.g., software, firmware, application code, computer instruction set, applet, smart device app, etc.) stored in a computer readable memory (e.g., random access memory (RAM), read only memory (ROM), flash memory, magnetic memory, optical memory, etc.) and executed by one or more processors (e.g., central processing unit (CPU), graphics processing unit (GPU), microprocessor (MPU), etc.) of a host general purpose processor-based system (e.g., smartphone, PDA, tablet device, digital camera, notebook computer, server, etc.). Additionally or alternatively, interferogram transform processing logic 160 may comprise hardware logic circuits (e.g., logic circuits provided by an application specific integrated circuit (ASIC), a field programmable gate array (FPGA), etc.). Irrespective of the particular implementation, interferogram transform processing logic 160 of embodiments of the invention is configured to transform interferograms to corresponding spectrum data. For example, interferogram transform processing logic 160 may implement Fourier transform computations to transform the raw interferogram data into data representative of the actual spectrum of the observed incident light, such as for analyzing light containing features of absorption or emission associated with a sample substance or mixture.

Figure 2A:
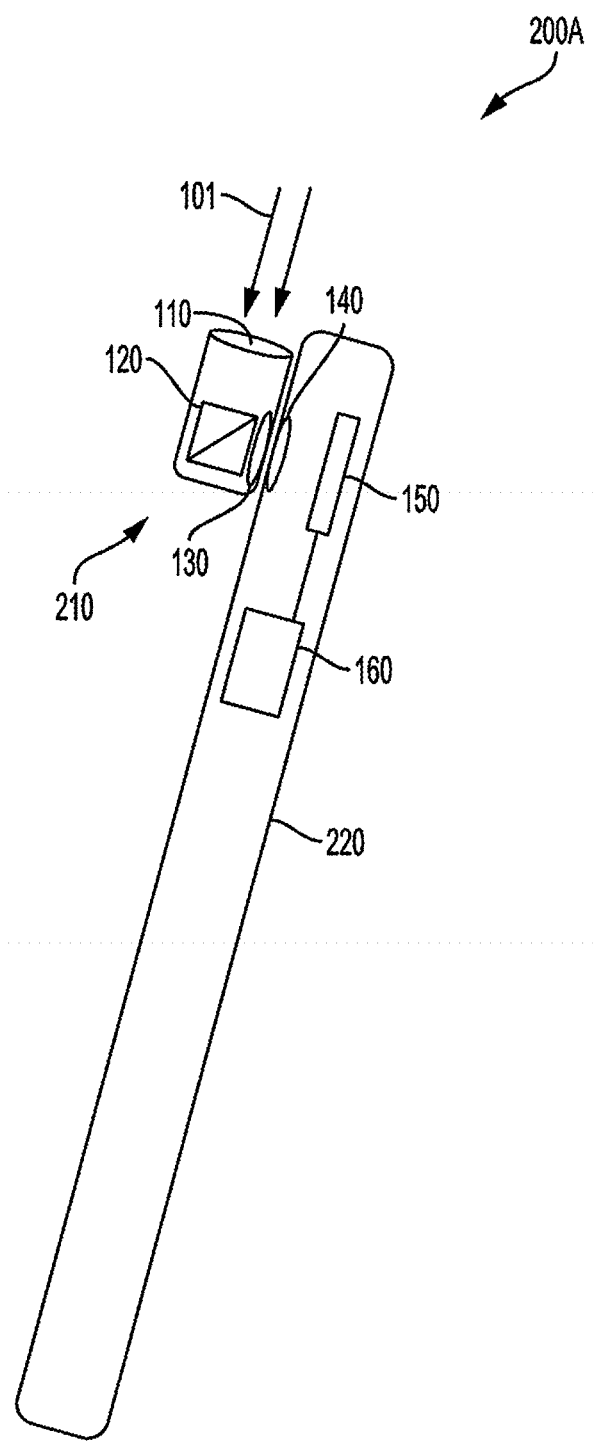
FIGS. 2A-2C show external accessory configuration of SFTI compact spectrometers in accordance with embodiments of the present invention.
Figure 2B:
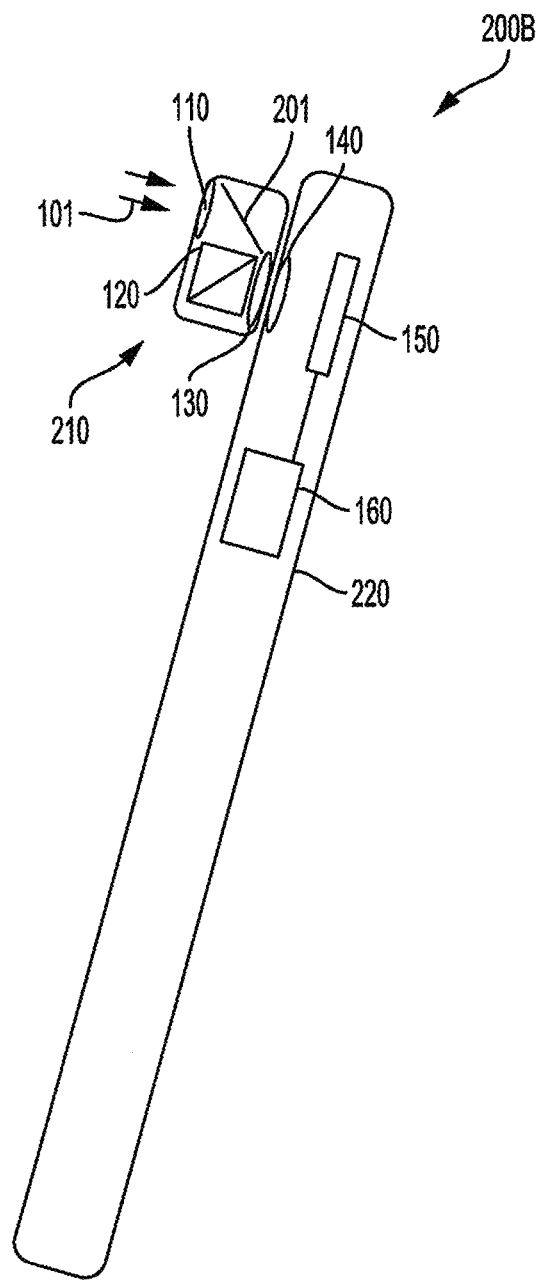
Figure 2C:
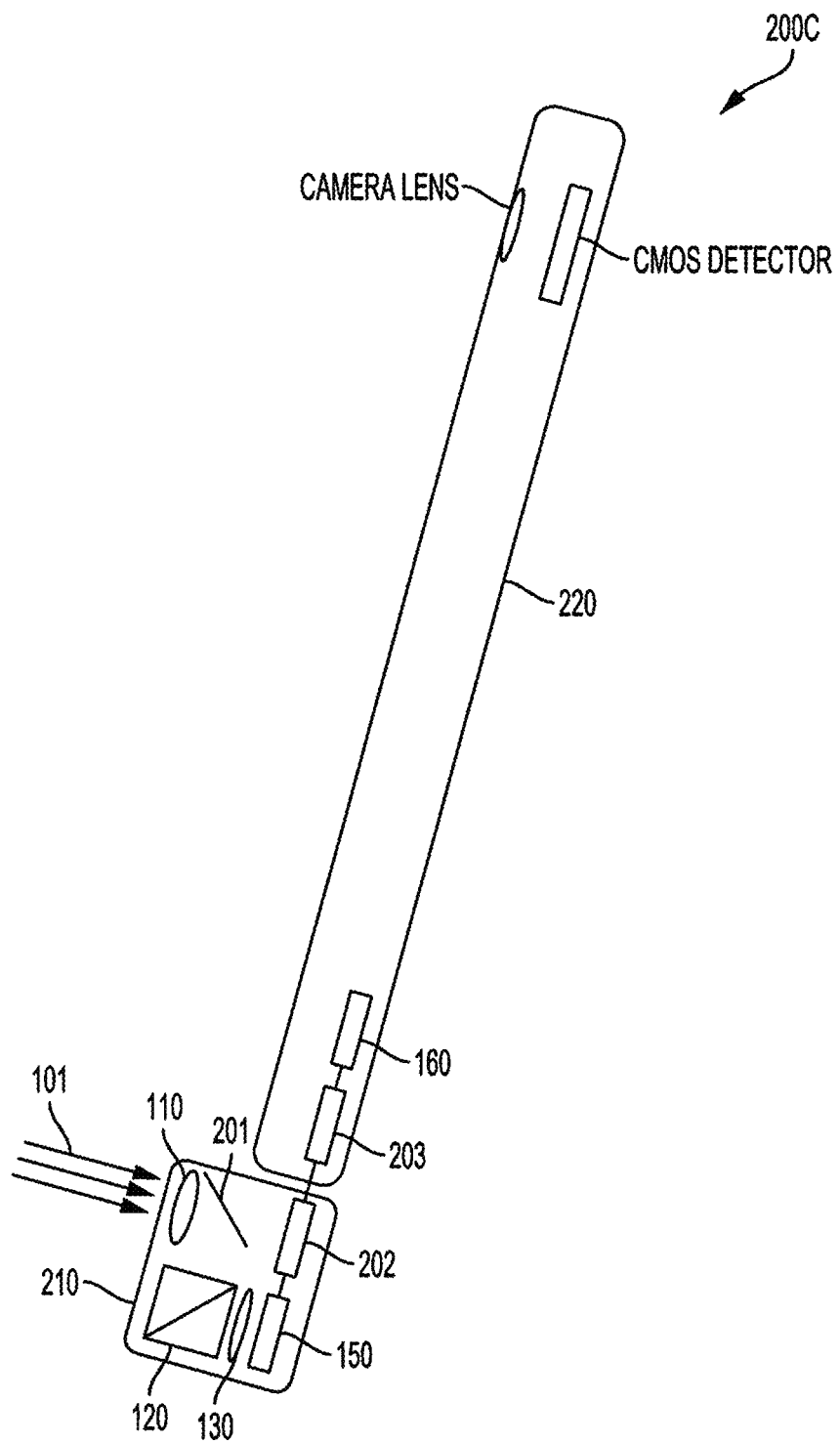
Figure 2D:
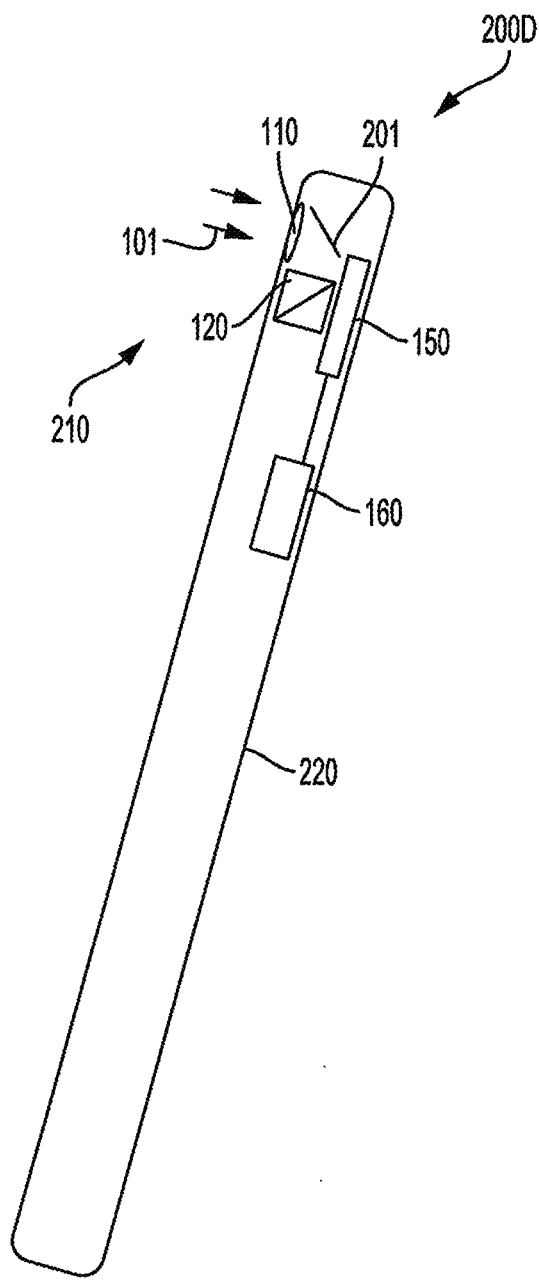
FIG. 2D shows an embedded configuration of SFTI compact spectrometers in accordance with embodiments of the present invention.
Figure 3:
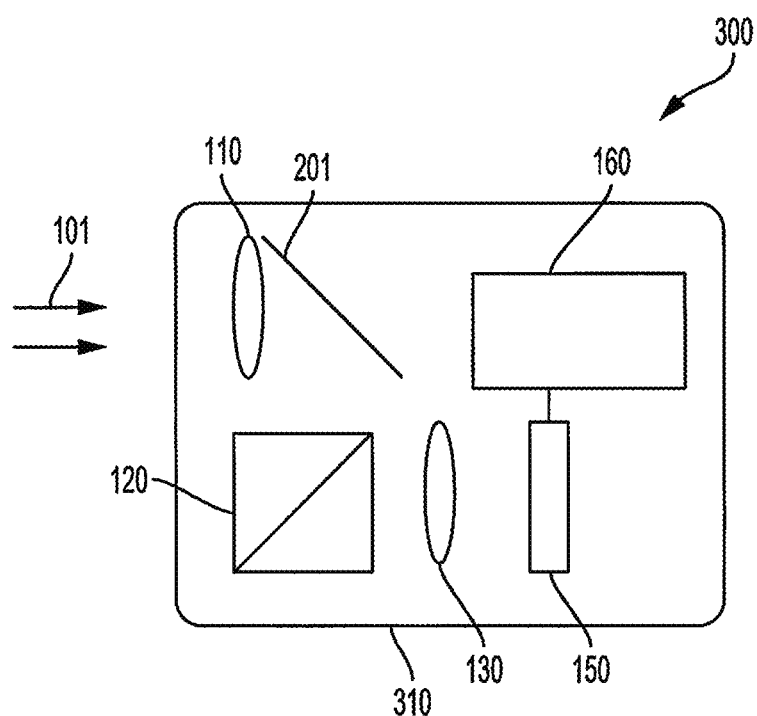
FIG. 3 shows a self-contained unit configuration of a SFTI compact spectrometer in accordance with embodiments of the present invention.

It should be appreciated from the foregoing that SFTI compact spectrometer 100 of FIG. 1 may be implemented in various configurations. For example, as shown in FIGS. 2A-2C, SFTI compact spectrometers consistent with the embodiment illustrated in FIG. 1 may be implemented as an external accessory configuration. As shown in FIG. 2D, a SFTI compact spectrometers consistent with the embodiment illustrated in FIG. 1 may be implemented in an embedded configuration. As shown in FIG. 3, a SFTI compact spectrometer consistent with the embodiment illustrated in FIG. 1 may be implemented as a self-contained unit.

The external accessory configurations of FIGS. 2A and 2B illustrate examples of implementations in which cooperative operation with an image capture device (e.g., digital camera) of a host device is utilized. In the embodiments of SFTI compact spectrometer 200A of FIG. 2A and SFTI compact spectrometer 200B of FIG. 2B, light source converter 110, SFTI cube 120, and lens 130 are disposed in peripheral unit 210 configured to externally attach to smartphone 220 in juxtaposition with an internal digital camera thereof (e.g., comprising lens 140 and light detector 150). SFTI compact spectrometer 200B of FIG. 2B includes mirror 201 disposed in peripheral unit 210 in the optical path between light source converter 110 and SFTI cube 120 in order to rotate the direction of incident light capture by the SFTI compact spectrometer (e.g., for smartphone broadside sampling by SFTI compact spectrometer 200B rather than smartphone edge-end sampling by SFTI compact spectrometer 200A). Lenses 130 of SFTI compact spectrometers 200A and 200B are configured to operate in cooperation with lens 140 of smartphone 220 to optimize the light output by SFTI cube 120 for capture by light detector 150 of smartphone 220. Smartphone 220 may be controlled to cause light detector 150 to capture an image (e.g., take a photograph using the internal digital camera) of light passed by the components of peripheral unit 210, thereby capturing the interference pattern light output by SFTI cube 120 for providing an interferogram. Interferogram transform processing logic 160 of SFTI compact spectrometers 200A and 200B may, for example, comprise code executed by a processor of smartphone 220 to transform interferograms to corresponding spectrum data in accordance with concepts of the present invention. The resultant spectrum data of embodiments may be stored in memory of smartphone 220, displayed (e.g., as a spectrum graph) to a user upon a display of smartphone 220, and/or communicated to one or more external devices (e.g., computer workstation, server, etc.) for storage, display, and/or further processing.

The external accessory configuration of FIG. 2C illustrates an example implementation in which, in addition to light source converter 110 (as well as mirror 201, or not, depending upon the desired direction of incident light capture by the SFTI compact spectrometer), SFTI cube 120, and lens 130, and light detector 150 are disposed in peripheral unit 210. Peripheral unit 210 of SFTI compact spectrometer 200C of embodiments thus comprises an image capture device (e.g., an internal digital camera) operable to capture interferograms. In operation, light detector 150 may be controlled (e.g., by smartphone 220) to capture an image (e.g., take a photograph) of light passed by the components of peripheral unit 210, thereby capturing the interference pattern light output by SFTI cube 120 for providing an interferogram. It can be appreciated that in the embodiment of SFTI compact spectrometer 200C of FIG. 2C, wherein an internal digital camera of smartphone 220 is not being used, lens 130 may be configured to optimize the light output by SFTI cube 120 for capture by light detector 150 without the use of lens 140 shown in FIG. 1. In accordance with some embodiments, light detector 150 may be used to capture the interferogram without the use of lenses (e.g., lens 130 and lense 140), although the image quality may not be optimized and light detector 150 should be as close as to SFTI cube 120 as practicable. Peripheral unit 210 of SFTI compact spectrometer 200C of the embodiment illustrated in FIG. 2C, although externally attached to smartphone 220, is not in juxtaposition with an internal digital camera thereof. Instead, peripheral unit 210 of SFTI compact spectrometer 200C is shown attached to smartphone 220 in juxtaposition with data interface 203 (e.g., a micro universal serial bus (USB) port, a LIGHTNING port, etc.). Correspondingly, peripheral unit 210 of SFTI compact spectrometer 200C includes data interface 202 for interfacing components within peripheral unit 210 with components of smartphone 220, such as for communication of interferogram data, controlling various components for operation of the SFTI compact spectrometer, etc. Data interfaces 202 and 203 may pass interferogram data provided by light detector 150 to interferogram transform processing logic 160. Interferogram transform processing logic 160 of SFTI compact spectrometer 200C may, for example, comprise code executed by a processor of smartphone 220 to transform interferograms to corresponding spectrum data in accordance with concepts of the present invention. The resultant spectrum data of embodiments may be stored in memory of smartphone 220, displayed (e.g., as a spectrum graph) to a user upon a display of smartphone 220, and/or communicated to one or more external devices (e.g., computer workstation, server, etc.) for storage, display, and/or further processing.

External accessory configurations comprising SFTI cubes in accordance with embodiments of the invention, such as those of FIGS. 2A-2C, provides a compact implementation facilitating a SFTI compact spectrometer having high resolution. For example, the external accessory configurations of FIGS. 2A and 2B may be embodied in a 8 mm×10 mm×20 mm form factor, wherein the SFTI compact spectrometer formed therewith using a smartphone host may provide a spectrum resolution of <2 nm@400 nm, <3 nm @600 nm, and <5 nm@1000 nm.

External accessory configurations may be embodied in form factors other than that of the illustrated examples. For example, an external accessory configuration comprising a SFTI cube of embodiments of the invention may be embedded to a smartphone case as an attachment.

FIG. 2D shows an embodiment in which a SFTI compact spectrometer is embedded in a host device, such as a mobile or portable device. In particular, the embedded configuration of FIG. 2D illustrates an example of an implementation in which SFTI compact spectrometer is embedded within smartphone 220. In the embodiment of SFTI compact spectrometer 200D of FIG. 2D, light source converter 110 (as well as mirror 201, or not, depending upon the desired direction of incident light capture by the SFTI compact spectrometer), SFTI cube 120, light detector 150, and interferogram transform processing logic 160 are disposed in smartphone 220. Although not shown in the illustrated example, a lens (e.g., lens 130 and/or lens 140) may be disposed between SFTI cube 120 and light detector 150 to optimize the light output by SFTI cube 120 for capture by light detector 150 of smartphone 220. It should be appreciated that various of the foregoing SFTI compact spectrometer components (e.g., light source detector 150, a processor of interferogram transform processing logic 160, etc.) may comprise components of the smartphone provided for other uses and/or utilized by other applications (e.g., camera applications) of the smartphone. Each of light source converter 110, mirror 201, SFTI cube 120, light detector 150, and interferogram transform processing logic 160 may operate in the embedded embodiment of SFTI compact spectrometer 200D in a similar manner to that described above. Accordingly, SFTI compact spectrometer 200D of embodiments may comprise a processor and memory wherein interferogram transform processing logic 160 may comprise code executed by the processor to transform interferograms to corresponding spectrum data in accordance with concepts of the present invention. The resultant spectrum data of embodiments may be stored in the memory, displayed (e.g., as a spectrum graph) to a user upon a display (not shown) of smart phone 220, and/or communicated to one or more external devices (e.g., computer workstation, server, etc.) for storage, display, and/or further processing.

It should be appreciated that, although embodiments of peripheral unit 210 have been described with respect to being physically attached to a host device (e.g., smartphone 220 of FIGS. 2A-2C) or embedded in a host device (e.g., FIG. 2D), the invention is not limited to physical attachment to a host device. For example, data interfaces 202 and 203 may comprise wireless interfaces (e.g., providing BLUETOOTH, WiFi, infrared, etc. data communication links) facilitating communication between components of peripheral unit 210 and a host device (e.g., smartphone 220). In such embodiments, the components of peripheral unit 210 may be utilized remotely with respect to the host device to capture incident light emitted by and/or reflected from a sample for which spectroscopy is to be performed.

The self-contained unit configuration of FIG. 3 illustrates an example implementation in which the SFTI compact spectrometer is provided in a unit comprising an image capture device (e.g., an internal digital camera), and thus an image capture device of a host device may not be utilized. In the embodiment of SFTI compact spectrometer 300 of FIG. 3, light source converter 110 (as well as mirror 201, or not, depending upon the desired direction of incident light capture by the SFTI compact spectrometer), SFTI cube 120, lens 130, light detector 150, and interferogram transform processing logic 160 are disposed in self-contained unit 310. Each of light source converter 110, mirror 201, SFTI cube 120, lens 130, light detector 150, and interferogram transform processing logic 160 may operate in the self-contained unit embodiment of SFTI compact spectrometer 300 in a similar manner to that described above. Accordingly, SFTI compact spectrometer 300 of embodiments may comprise a processor and memory wherein interferogram transform processing logic 160 may comprise code executed by the processor to transform interferograms to corresponding spectrum data in accordance with concepts of the present invention. The resultant spectrum data of embodiments may be stored in the memory, displayed (e.g., as a spectrum graph) to a user upon a display (not shown) of or connected to self-contained unit 310, and/or communicated to one or more external devices (e.g., computer workstation, server, etc.) for storage, display, and/or further processing.

Figure 4:
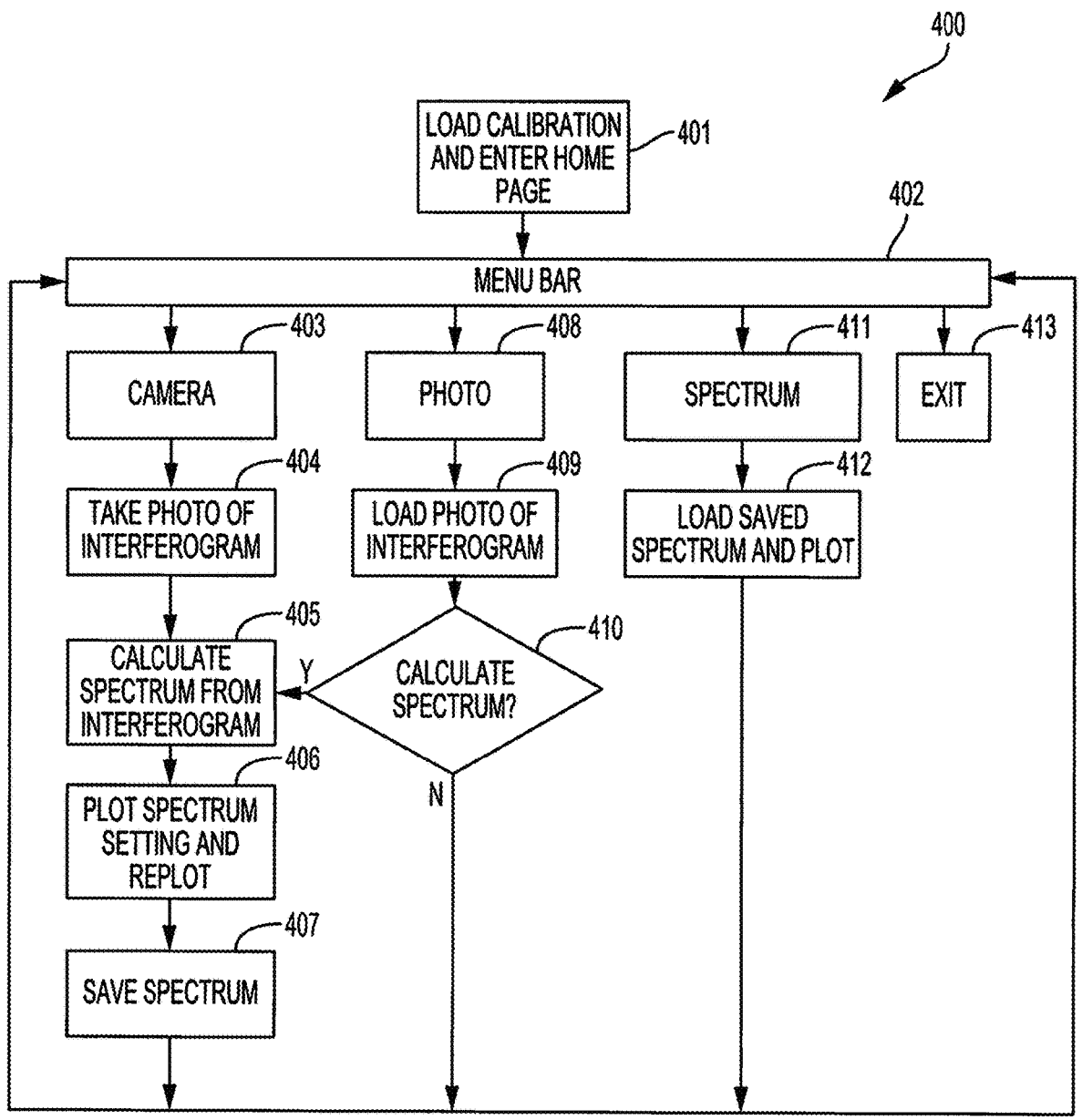
FIG. 4 shows a functional block diagram of a processor-based application configured to provide for capturing interferograms using a SFTI cube and transforming interferograms to spectrum data in accordance with embodiments of the invention.

A functional block diagram of an processor-based application (e.g., software, firmware, application code, computer instruction set, applet, smart device app, etc.), such as may comprise interferogram transform processing logic 160 of embodiments, is shown in FIG. 4. Application 400 of FIG. 4, may for example, be executed by a processor of smartphone 220 to provide for capturing interferograms using a SFTI cube and transforming interferograms to spectrum data in accordance with embodiments of the invention. It should be appreciated, however, that application 400, or portions thereof, may additionally or alternatively be executed on additional or alternative processor-based platforms (e.g., computer workstation, server, etc.).

At block 401 of the illustrated embodiment of application 400, the application is loaded and one or more calibrations may be performed. In operation according to embodiments, one or more lasers having known wavelengths may be used to calibrate the SFTI compact spectrometer. For example, two or more lasers may be used to provide incident light having known wavelengths to the SFTI spectrometer and photos of the interferograms for the lasers may be captured. Using the captured interferograms for the light of known wavelengths a calibration file for the SFTI compact spectrometer may be generated and stored for later use in providing correction to spectrometer operation. Such calibration may be performed asynchronously with respect to normal use of the SFTI compact spectrometer, such as at a time of manufacture, at a time of field deployment, etc.

A home screen for presenting options to the user for SFTI compact spectrometer operation is provided in the illustrated embodiment of application 400. For example, in the illustrated embodiment at block 402 a menu is presented, such as may allow a user to control a light sensor to capture incident light using a SFTI cube to provide interferograms and generate corresponding spectrum (e.g., blocks 403-407), to access previously captured interferograms for viewing/ analysis and/or to generate corresponding spectrum (e.g., blocks 408-410), to access previously generated spectrum for viewing/analysis (e.g., blocks 411 and 412), and to exit the application (e.g., block 413).

In operation of application 400 of the illustrated embodiment, a user may select a menu item at block 402 to initiate operation to control a light sensor to capture incident light using a SFTI cube to provide interferograms and generate corresponding spectrum. For example, the selection of a respective menu item may cause processing to proceed to block 403 wherein a digital camera (e.g., comprising light detector 150) is accessed and prepared for operation. Thereafter, processing according to the illustrated embodiment proceeds to block 404 wherein the digital camera is controlled to take a photo which, due to operation of a SFTI cube of embodiments (e.g., a peripheral unit comprising light source converter 110 and SFTI cube 120 disposed in juxtaposition with the digital camera), captures an interferogram (e.g., interferogram 102). At block 405 of application 400 shown in FIG. 4, corresponding spectrum (e.g., spectrum 103) is calculated from the captured interferogram (e.g., implementing Fourier transform computations). Thereafter, in operation according to the illustrated embodiment, processing proceeds to block 406 wherein the spectrum is plotted, such as for presentation and/or reporting (e.g., for viewing/analysis). Application 400 of the illustrated embodiment further operates to save the computed spectrum, such as for later use, at block 407. After completing operation to control a light sensor to capture incident light using a SFTI cube to provide interferograms and generate corresponding spectrum, application 400 may return to the menu for further selection operational aspects of the application.

In operation of application 400 of the illustrated embodiment, a user may further select a menu item at block 402 to access previously captured interferograms for viewing/analysis and/or to generate corresponding spectrum. For example, the selection of a respective menu item may cause processing to proceed to block 408 wherein a previously captured digital photo of an interferogram (e.g., an interferogram captured by the digital camera and saved to memory) is accessed. Thereafter, processing according to the illustrated embodiment proceeds to block 409 wherein the interferogram is loaded, such as for viewing/analysis. In operation according to the illustrated embodiment, the user may elect to calculate corresponding spectrum for the interferogram at block 410 (e.g., the user may wish only to view or analyze the interferogram itself or may wish to perform spectroscopy using the interferogram). If the user elects to calculate corresponding spectrum for the interferogram, processing according to the illustrated embodiment proceeds to block 405 for operation as described above. Otherwise, application 400 may return to the menu for further selection operational aspects of the application.

In operation of application 400 of the illustrated embodiment, a user may also select a menu item at block 402 to access previously generated spectrum for viewing/analysis. For example, the selection of a respective menu item may cause processing to proceed to block 411 wherein previously calculated spectrum (e.g., spectrum calculated from an interferogram captured by the digital camera and saved to memory) is accessed. Thereafter, processing according to the illustrated embodiment proceeds to block 412 wherein the spectrum is loaded, such as for viewing/analysis. After completing operation to access previously generated spectrum for viewing/analysis, application 400 may return to the menu for further selection operational aspects of the application.

In operation of application 400 of the illustrated embodiment, a user may also select a menu item at block 402 to exit the application. For example, the selection of a respective menu item may cause processing to proceed to block 413 wherein execution of application 400 is exited.

Having described exemplary embodiments of SFTI compact spectrometers implemented in accordance with concepts of the present invention, further detail regarding configurations of SFTI cubes as utilized thereby is provided below to further aid in understanding concepts herein. As previously mentioned, SFTI cubes of embodiments (e.g., SFTI cubes 120 of embodiments of FIGS. 2A-2C and 3) provides a dual wedge beam splitter in a monolithic structure comprising mirrored wedge surfaces disposed at two output surfaces of a beam splitter. Such a monolithic SFTI cube structure may, for example, be manufactured from one broadband beam splitter cube and two identical small angle wedges cemented (e.g., using Norland optical adhesive) to orthogonal surfaces of the beam splitter cube. In accordance with embodiments of the invention, the beam splitter cube and wedges are made of the same material (e.g., BK7 optical glass). The surfaces of the two wedges that are located at the output surfaces of the beam splitter are mirror coated, according to embodiments of the invention. In an alternative embodiment, a monolithic SFTI cube structure may be manufactured from a broadband beam splitter cube by cutting off or otherwise removing (e.g., ablating) two small angle wedges, wherein the surfaces of the two wedges are mirror coated.

Figure 5A:
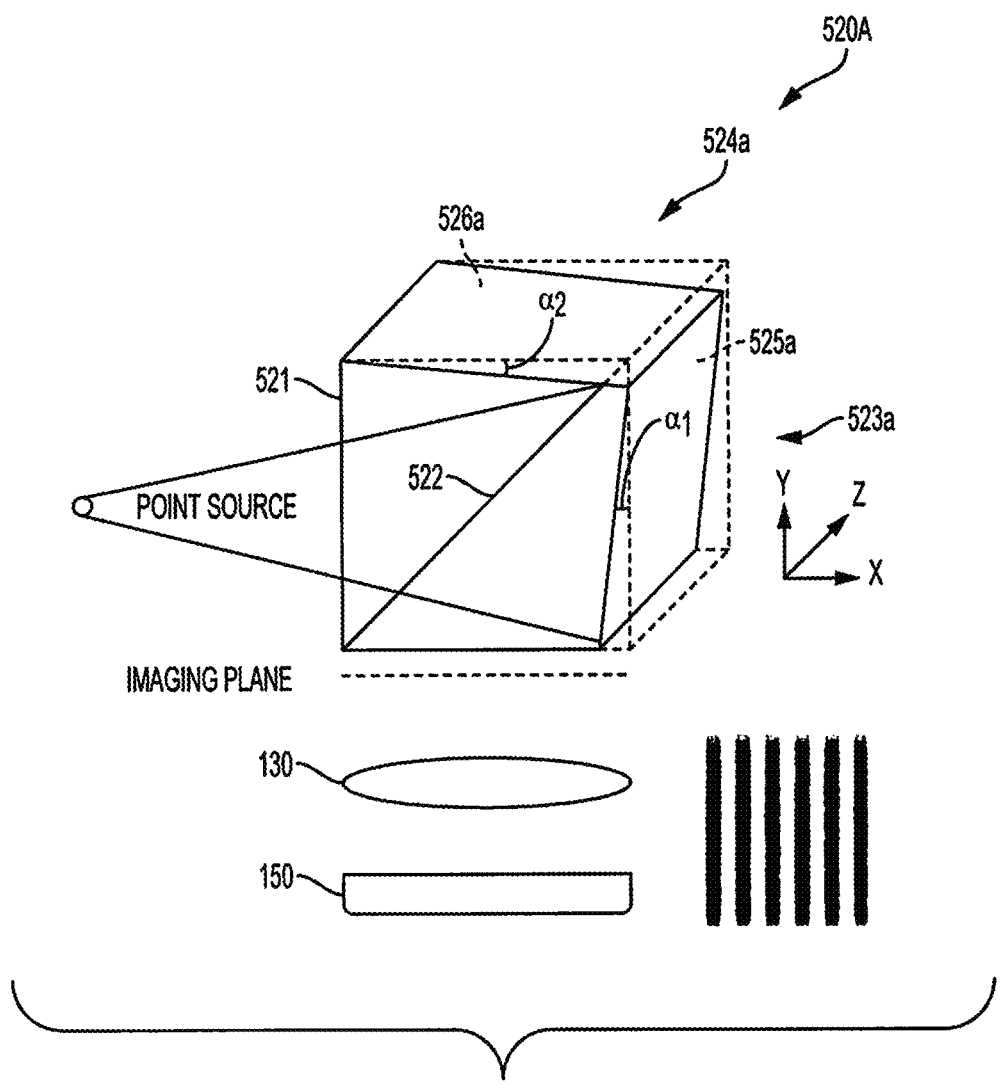
FIGS. 5A-5F show detail with respect to SFTI cubes of embodiments of the present invention.
Figure 5B:
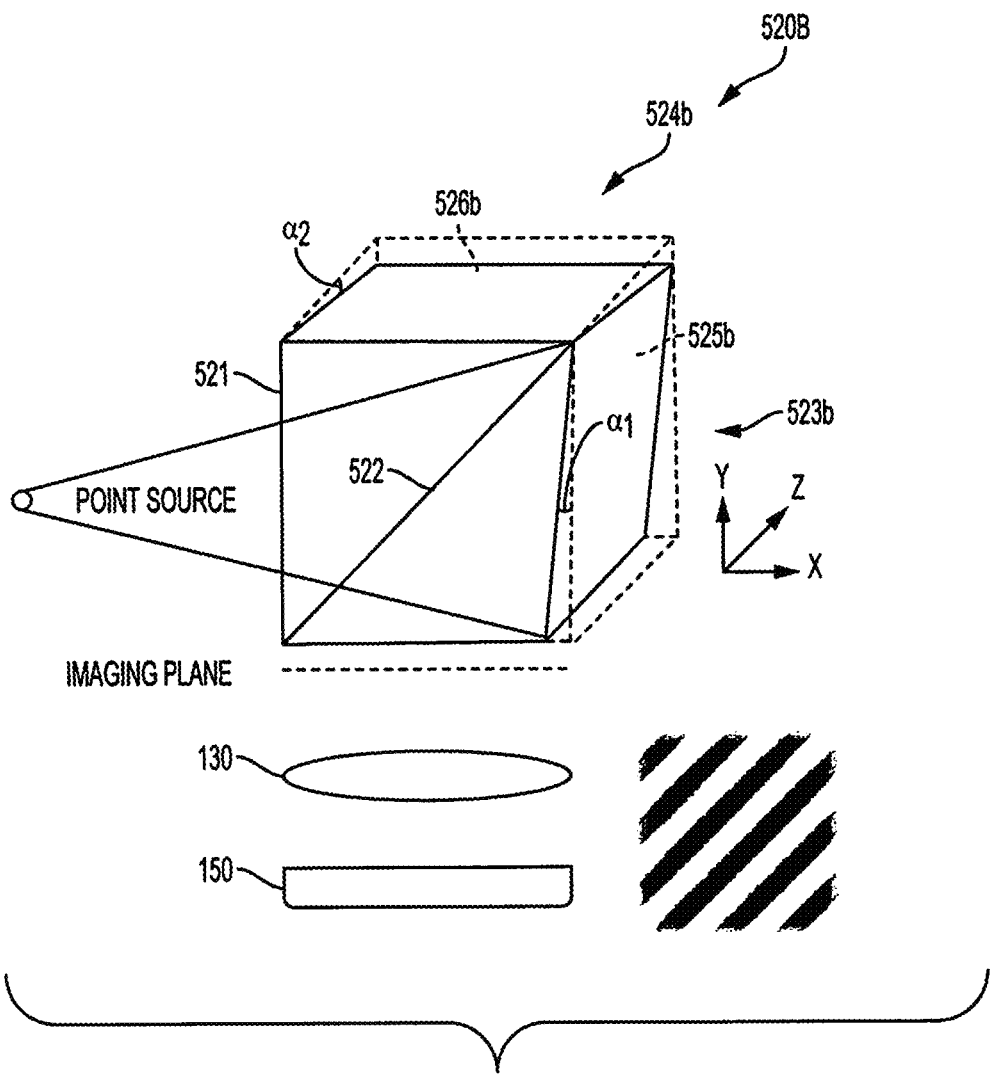
Figure 5C:
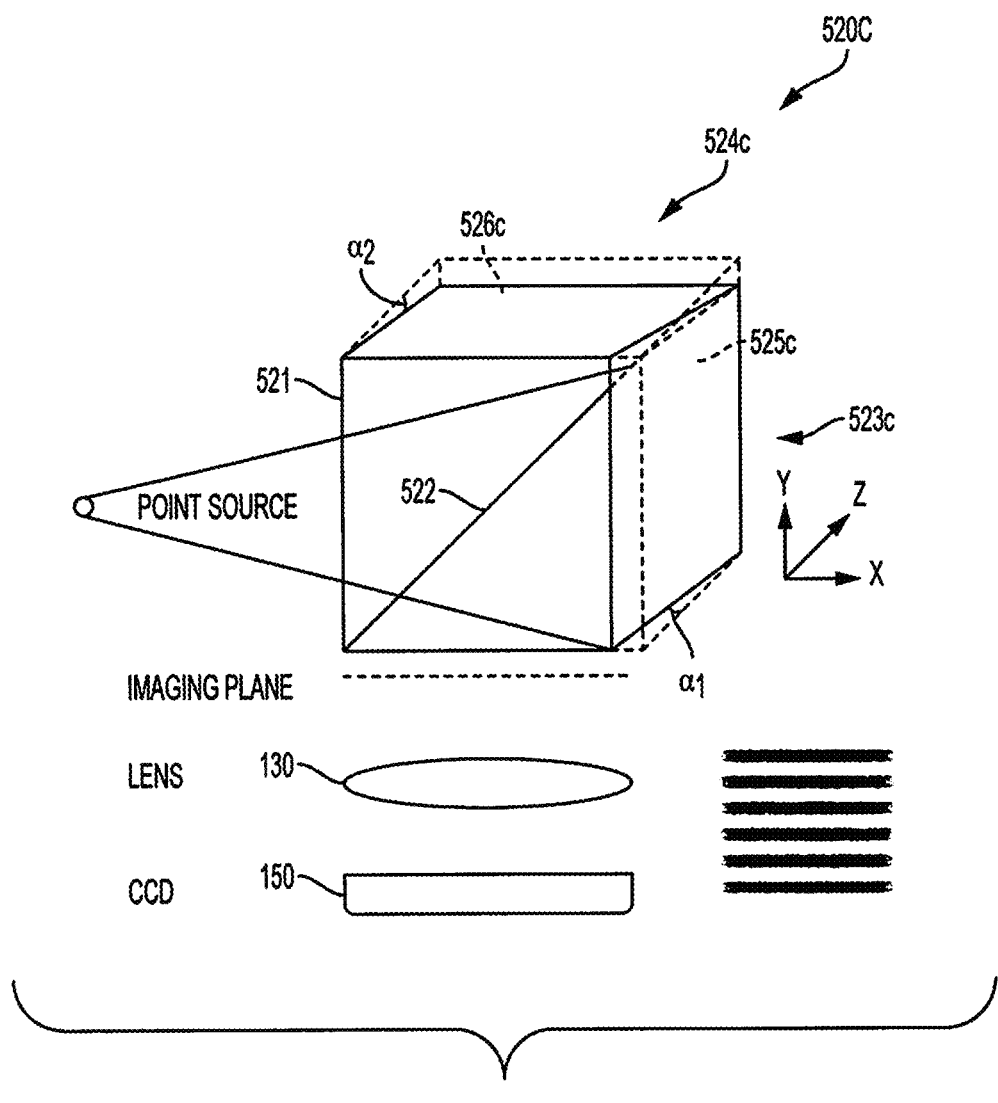
Figure 5D:
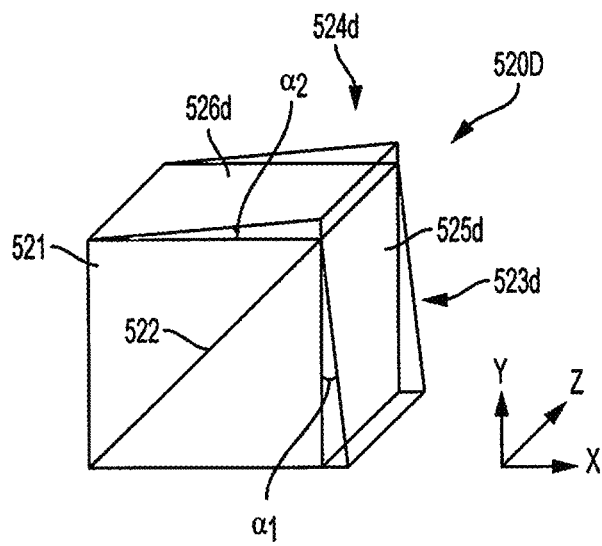
Figure 5E:
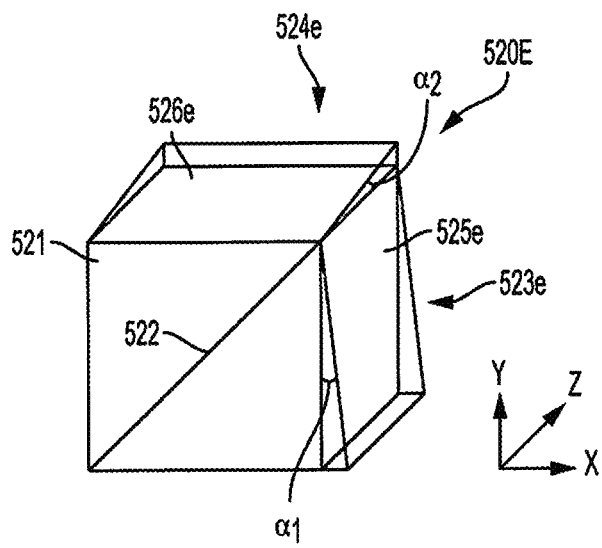
Figure 5F:
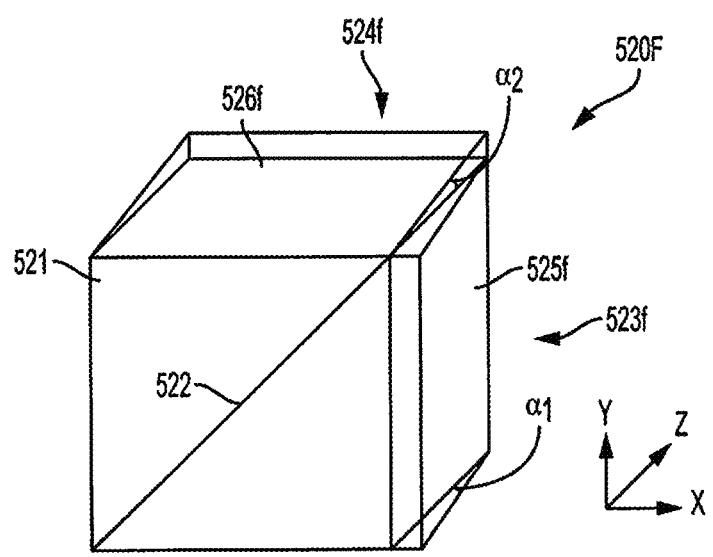

The two wedges of SFTI cubes of embodiments are arranged such that wedged surfaces of the resulting beam splitter cube are tilted to opposite or orthogonal directions so that the virtual image of one wedge surface can cross over the other wedge surface, as shown in the exemplary implementations of FIGS. 5A-5C. SFTI cubes 520A (FIG. 5A), 520B (FIG. 5B), and 520C (FIG. 5C), such as may correspond to embodiments of any or all of SFTI cubes 120 of FIGS. 1, 2A-2D, and/or 3) comprise optical glass cube 521 having broadband beam splitter 522 disposed therein and two wedges, shown as wedges 523a and 524a in FIG. 5A, 523b and 524b in FIG. 5B, and 523c and 524c in FIG. 5C. As can be seen in the example of FIG. 5A, mirrored surface 525a of wedge 523a and mirrored surface 526a of wedge 524a are each tilted by respective angles $\alpha_1$ and $\alpha_2$ (referred to herein as a wedge angles), in orthogonal directions (i.e., mirrored surface 525a is tilted along the Y axis in the YZ plane whereas mirrored surface 526a is tilted along the X axis in the XZ plane). Similarly, mirrored surface 525b of wedge 523b and mirrored surface 526b of wedge 524b are each tilted by respective wedge angles $\alpha_1$ and $\alpha_2$, in orthogonal directions (i.e., mirrored surface 525b is tilted along the Y axis in the YZ plane whereas mirrored surface 526b is tilted along the Z axis in the XZ plane). Likewise, mirrored surface 525c of wedge 523c and mirrored surface 526c of wedge 524c are each tilted by respective wedge angles $\alpha_1$ and $\alpha_2$, in orthogonal directions (i.e., mirrored surface 525c is tilted along the Z axis in the YZ plane whereas mirrored surface 526c is tilted along the Z axis in the XZ plane). The foregoing monolithic SFTI cube structures may be manufactured from one broadband beam splitter cube by cutting off or otherwise removing either or both angle wedges. Additionally or alternatively, such monolithic SFTI cube structures may be manufactured from one broadband beam splitter cube by affixing either or both wedge angles. The embodiments illustrated in FIGS. 5D-5F show SFTI cube structures formed from adhering (e.g., cementing) two identical small angle wedges to orthogonal surfaces of the beam splitter cube.

In accordance with some embodiments of the invention, wedge angles $\alpha_1$ and $\alpha_2$ may comprise a same angle $\alpha$ (i.e., $\alpha_1=\alpha_2=\alpha$), whereby the SFTI cube is provided with a symmetric wedge angle configuration. It should be appreciated that, although some embodiments may comprise configurations wherein the dual wedges utilize a same wedge angle (i.e., symmetric wedge angles), embodiments of the invention may instead comprise dual wedges utilizing different wedge angles (i.e., $\alpha_1 \neq \alpha_2$), whereby the SFTI cube is provided with a non-symmetric wedge angle configuration. For example, an embodiment of a SFTI cube structure may implement an asymmetric wedge angle configuration in which the two wedges angles are different, such as to reduce the high accuracy requirement and effort in manufacturing of the SFTI cube. Preferred embodiments, however, utilize symmetric wedge angles for simplification of the SFTI compact spectrometer (e.g., to simplify the logic of the interferogram transform logic). For example, using symmetric wedge angles according to embodiments, the ZOPD position locates in the middle of field of view, which can ensure capability of the interferometer for getting the interference fringes of broad band light source. That is, in operation of a SFTI cube of embodiments, the incident light is split into two beams on the beam splitter surface, wherein the two beams are reflected by the two wedge mirrors and finally arrive at the image plane. On the ZOPD position, the optical paths of the two beams are the same. For broad band light source with low spatial coherence such as LED and natural light, there are only a few interference fringes which only appear around the ZOPD. Thus, to ensuring the ZOPD is in the field of view is useful for obtaining the full spectrum of the broadband light source.

The foregoing exemplary configurations arrange the two reflective mirrors as slightly tilted to opposite directions so that the resulting beams cross over one another and form an interference pattern, wherein fringes of broadband light source fall in the field of view. In the example shown in FIG. 5A, the normal axes of the two wedge surfaces are in the same plane of the back-side surface of the beam splitter cube so that the resulting interference pattern are vertical line fringes. In the example shown in FIG. 5B, the normal axis of the wedge surface of one wedge is in the same plane of the back-side surface of the beam splitter cube and the normal axis of the wedge surface of the other wedge is titled away from the plane of the back-side surface of the beam splitter cube so that the resulting interference pattern are line fringes along 45 degrees.

It should be appreciated that the foregoing monolithic SFTI cubes are configured to form interference patterns without the need for external mirrors or any moving components. Such configurations are compact (e.g., implemented in a 6 mm×6 mm×6 mm form factor) and stable, such as is compatible with a highly portable implementation (e.g., mobile device or smartphone peripheral unit configuration).

Having described exemplary embodiments of SFTI cubes in accordance with concepts of the present invention, further detail regarding the wedge angles, $\alpha$, as may be utilized with respect thereto is provided below to further aid in understanding concepts herein. The particular wedge angle(s) utilized in an implementation of a SFTI cube may be selected from a range of suitable wedge angles (e.g., $\alpha_{MIN} \leq \alpha \leq \alpha_{MAX}$), such as may vary depending upon factors such as the resolution of the light sensor, the capabilities of the interferogram transform processing logic, the desired spectral resolution, etc. For example, the maximum value for a wedge angle, $\alpha_{MAX}$, may be selected so as not to be so large as to increase the interference to be complex to the point of the processing requirements for transforming an interferogram to corresponding spectrum is practicably beyond the capabilities of available processor resources. The minimum value for a wedge angle, $\alpha_{MIN}$, may be selected so as not to be so small as to reduce the interference to the point that an interferogram does not support desired spectral resolution when transformed. As one example, a range of suitable wedge angles in accordance with embodiments may be determined to be 0.5-3 degree in an implementation wherein the light sensor provides 1 micron resolution (e.g., a common smartphone digital camera configuration), the interferogram transform processing logic performs Fourier transform computations using a relatively low power 32 bit processor (e.g., a common smartphone MPU configuration), and the desired spectral resolution is <2 nm@400 nm, <3 nm @600 nm, <5 nm@1000 nm. The wedge angles suitable for use with respect to implementations of SFTI cubes in accordance with concepts of the present invention may be determined as shown below.

In embodiments where wedge angles $\alpha_1$ and $\alpha_2$ comprise a same angle $\alpha$ (i.e., a symmetric wedge angle configuration in which $\alpha_1=\alpha_2=\alpha$), $\alpha_{MIN} \leq \alpha_1=\alpha_2 \leq \alpha_{MAX}$. In embodiments where wedges $\alpha_1$ and $\alpha_2$ comprise different wedge angles (i.e., a non-symmetric wedge angle configuration in which $\alpha_1 \neq \alpha_2$), the average of two wedge angles $\alpha_1$ and $\alpha_2$ should be between $\alpha_{MIN}$ and $\alpha_{MAX}$ ($\alpha_{MIN} \leq (\alpha_1+\alpha_2)/2 \leq \alpha_{MAX}$) according to embodiments of the invention. It can be appreciated that both of the foregoing configurations according to embodiments may be generalized using $\alpha_{MIN} \leq (\alpha_1+\alpha_2)/2 \leq \alpha_{MAX}$ as the wedge angle selection rule.

In determining a range of wedge angles (e.g., $\alpha_{MIN}-\alpha_{MAX}$) suitable for use with respect to a SFTI cube of a SFTI compact spectrometer implementation, a maximum wedge angle, $\alpha_{MAX}$, may be determined as set forth below. In accordance with embodiments of the invention, the maximum wedge angle value $\alpha_{MAX}$ should satisfy the condition that the fringe period from the light of minimum wavelength is larger than two times of the pixel size the detector used (e.g., light detector 150). The value $\alpha_{MAX}$ can be estimated as:

$$\alpha_{MAX} = \arctan\left(\frac{\lambda_{MIN}}{2nd_{MIN}}\right) \quad (1)$$

For example, with $\lambda_{MIN}=350$ nm, n=1.539 (BK7), $d_{MIN}=2\times 1$ um (twice of pixel size), $\alpha_{MAX}$ can be estimated to be 3.25°. A more precise calculation of $\alpha_{MAX}$, however, takes additional factors into consideration. For example, taking the point source position, cube dimension and CMOS dimension into consideration, a more precise calculation of $\alpha_{MAX}$ can be conducted by solving the following equation:

$$\frac{2n}{\lambda_{MIN}}\left\{\left[\left(2(s+D-\frac{D\tan\alpha_{MAX}}{2})\cos\alpha_{MAX}\sin\alpha_{MAX}+\frac{d}{2}\right)^2 + \right.\right. \quad (2)$$
$$\left(2(s+D-\frac{D\tan\alpha_{MAX}}{2})\cos^2\alpha_{MAX}-s\right)^2\right]^{\frac{1}{2}} -$$
$$\left[\left(2(s+D-\frac{D\tan\alpha_{MAX}}{2})\cos\alpha_{MAX}\sin\alpha_{MAX}-\frac{d}{2}\right)^2 + \right.$$

-continued $$\left(2\left(s+D-\frac{D\tan\alpha_{MAX}}{2}\right)\cos^2\alpha_{MAX}-s\right)^2\right)^{\frac{1}{2}}=\frac{1}{2}N$$

where s is the distance from point source to SFTI cube entry surface, D is the side length of the SFTI cube, d is the length of the light detector, and N is the number of pixels of the light detector. For example, with $\lambda_{MIN}$=350 nm s=2 mm, D=6 mm, d=5.12 mm, N=5120, n=1.509, $\alpha_{MAX}$ can be calculated to be 2.94°.

In determining the maximum wedge angle value $\alpha_{MAX}$ according to embodiments of the invention, the fringe period from the light of minimum wavelength should be larger than the diffraction limit. That is:

$$d'_{MIN}=\frac{1.22\lambda F}{D} \quad (3)$$

In the case of the Huawei P10 Plus light detector, for example, F/D=2.2, $d'_{MIN}<d_{MIN}$, and therefore the diffraction limit can be ignored. However, it should be appreciated that when a smaller aperture is used in taking a photo of an interferogram, it could result in $d'_{MIN}>2$ um, and thus $\alpha_{MAX}$ would be smaller than 2.94°. Moreover, when the input light is not an ideal point source nor an ideal collimated beam, or the optical imaging quality is not good, then interference fringe pattern might become blurred, resulting in $d_{MIN}>2$ um, and thus $\alpha_{MAX}$ would be smaller than 2.94°.

In determining a range of wedge angles (e.g., $\alpha_{MIN}$-$\alpha_{MAX}$) suitable for use with respect to a SFTI cube of a SFTI compact spectrometer implementation, a minimum wedge angle, $\alpha_{MIN}$, may be determined as set forth below. In accordance with embodiments of the invention, the minimum wedge angle value $\alpha_{MIN}$ should satisfy the condition that sufficient optical path difference is generated to give desired spectral resolution. Accordingly, the value $\alpha_{MIN}$ can be calculated as:

$$\alpha_{MIN}=\arctan\left(\frac{\lambda_{MAX}^2}{2nD\Delta\lambda}\right) \quad (4)$$

For example, with $\lambda_{MAX}$=532 nm, n=1.509 (BK7), D=6 mm, $\Delta\lambda$=2 nm, then $\alpha_{MIN}$ can be calculated to be 0.45°. It should be appreciated that, for some applications which have no requirement on high spectral resolution, the $\alpha_{MIN}$ can be smaller than calculated by equation (4) (e.g., smaller than 0.45° in the foregoing example). However, in practice the value of $\alpha_{MIN}$ is constrained by the manufacturing accuracy. To make sure the zero optical path difference locates in the field of view, $\alpha_{MIN}$ should give sufficient tolerance $\Delta D$ for manufacturing, as provided by the following:

$$\alpha_{MIN}=\arctan\left(\frac{\Delta D}{2D}\right) \quad (5)$$

For example, with $\Delta D$=0.1 mm, D=6 mm, then $\alpha_{MIN}$ can be calculated to be 0.48°. If the manufacturing accuracy is higher and there is no specific requirement on spectral resolution, $\alpha_{MIN}$ can be smaller than 0.48°.

Figure 6:
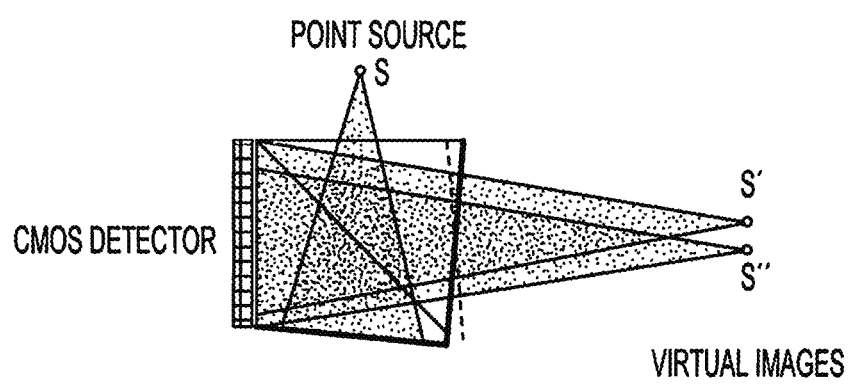
FIG. 6 shows an experimental SFTI cube implementation for simulating operation of a SFTI compact spectrometer in accordance with embodiments of the present invention.

Experimental results for a SFTI cube implemented in accordance with concepts of the present invention were obtained in a configuration simulating operation of the SFTI cube in a SFTI compact spectrometer. In the experiments, a Huawei P10 Plus CMOS color camera sensor and a monochrome camera sensor were utilized as the light sensor and placed in association with a SFTI cube of an embodiment of the invention, as shown in FIG. 6. The Huawei P10 Plus CMOS color camera sensor used provided 2976×3968 pixels and the monochrome camera sensor used provided 3840×5120 pixels. The embodiment of the SFTI cube used was 6 mm×6 mm×6 mm, comprised of BK7 optical glass, and had a wedge angle of 0.5 degree. The light source used was point source broad-band white light (500 nm -700 nm) for one series of experiments and 532 nm and 639 nm lasers for another series of experiments. The point source to cube distance was 6 mm.

The observed results from the aforementioned experiments are shown in FIGS. 7A-7D and 8A-8D. In particular, FIGS. 7A-7D show the observed results with respect to the white light source and FIGS. 8A-8D show the observed results with respect to the laser light sources. In particular, FIGS. 7A and 7B show interferograms resulting from white light captured using color light detectors (e.g., color camera), FIG. 7C shows an interferogram resulting from white light captured using a black and white light detector (e.g., black and white camera), FIG. 7D shows spectra calculated from the interferogram of FIG. 7B, and FIG. 7E shows spectra calculated from the interferogram of FIG. 7C. Similarly, FIG. 8A shows an interferogram resulting from 639 nm laser light captured using a color light detector, FIG. 8B shows an interferogram resulting from 532 nm laser light captured using a color light detector, FIG. 8C shows an interferogram resulting from 639 nm light captured using a black and white light detector, FIG. 8D shows spectra calculated from the interferogram of FIG. 8B, and FIG. 8E shows spectra calculated from the interferogram of FIG. 8C. The experimental implementation demonstrates that a SFTI cube in accordance with concepts of the present invention can achieve zero optical path difference (ZOPD) in the middle of the light detector, as shown by the fringes in boxes 701a-701c of FIGS. 7A-7C. The experimental implementation further demonstrates that a SFTI compact spectrometer in accordance with concepts of the present invention can achieve high resolution, as shown by the resolution of ~2 nm at 532 nm in the spectrum graph of FIG. 8D.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for generation of interferograms, the system comprising:
a monolithic beam splitter cube member having at least two reflective wedge surfaces, wherein the at least two reflective wedge surfaces are provided as part of a monolithic structure of the monolithic beam splitter cube member, and wherein a first and second reflective wedge surface of the at least two reflective wedge surfaces having adjacent edges are tilted away from orthogonal directions by non-zero wedge angles $\alpha_1$ and $\alpha_2$ respectively so that beams of light provided by a beam splitter of the monolithic beam splitter cube member cross over one another and form an interference pattern configured for capture by a light detector providing an interferogram; and
a light source converter disposed in an optical input path of the monolithic beam splitter cube member.

2. The system of claim 1, wherein the wedge angles $\alpha_1$ and $\alpha_2$ are each selected from a range of wedge angles $\alpha_{MIN} \leq (\alpha_1+\alpha_2)/2 \leq \alpha_{MAX}$ determined to be suitable for a static Fourier transform interferometer (SFTI) compact spectrometer.

3. The system of claim 2, wherein the wedge angles $\alpha_1$ and $\alpha_2$ comprise a same wedge angle $\alpha$ such that the at least two reflective wedge surfaces are each tilted by the same wedge angle $\alpha$.

4. The system of claim 2, wherein the wedge angles $\alpha_1$ and $\alpha_2$ comprise different wedge angles such that the at least two reflective wedge surfaces are each tilted by a different wedge angle.

5. The system of claim 1, wherein the orthogonal directions are selected so that interference fringes of the interferograms align vertically in a field of view of the light detector when the light detector is disposed in an optical output path of the monolithic beam splitter cube member.

6. The system of claim 1, wherein the orthogonal directions are selected so that interference fringes of the interferograms align horizontally in a field of view of the light detector when the light detector is disposed in the optical output path of the monolithic beam splitter cube member.

7. The system of claim 1, wherein the orthogonal directions are selected so that interference fringes of the interferograms align diagonally in a field of view of the light detector when the light detector is disposed in the optical output path of the monolithic beam splitter cube member.

8. The system of claim 1, wherein the monolithic beam splitter cube member and the light source converter are disposed in an external accessory form factor, wherein the external accessory is configured to cooperate with a host processor-based system and form a static Fourier transform interferometer (SFTI) compact spectrometer.

9. The system of claim 8, wherein the host processor-based system is selected from the group consisting of a digital camera, a smartphone, a personal digital assistant (PDA), a tablet device, and a personal computer.

10. The system of claim 8, wherein the external accessory is configured to attach to the host processor-based system in juxtaposition with the light detector when the light detector is comprised in the host processor-based system.

11. The system of claim 10, further comprising:
a lens disposed in an optical output path of the monolithic beam splitter cube member, wherein the lens is disposed between the monolithic beam splitter cube member and the light detector of the host processor-based system.

12. The system of claim 8, further comprising:
the light detector disposed in an optical output path of the monolithic beam splitter cube member, wherein the light detector is disposed in the external accessory form factor; and
a data interface coupled to the light detector, wherein the data interface is disposed in the external accessory form factor, and wherein the external accessory is configured to communicate the interferograms to the host processor-based system via the data interface.

13. The system of claim 1, further comprising:
the light detector disposed in an optical output path of the monolithic beam splitter cube member; and
interferogram transform processing logic coupled to the light detector.

14. The system of claim 13, wherein the monolithic beam splitter cube member, the light source converter, the light detector, and the interferogram transform processing logic are disposed in a self-contained unit form factor.

15. The system of claim 13, wherein the monolithic beam splitter cube member, the light source converter, the light detector, and the interferogram transform processing logic are disposed in a mobile electronic device in an embedded form factor.

16. A method for generation of interferograms, the system method comprising:
providing a monolithic beam splitter cube member having at least two reflective wedge surfaces, wherein the at least two reflective wedge surfaces are provided as part of a monolithic structure of the monolithic beam splitter cube member, and wherein a first and second reflective wedge surface of the at least two reflective wedge surfaces having adjacent edges are tilted away from orthogonal directions by non-zero wedge angles $\alpha_1$ and $\alpha_2$ respectively so that beams of light provided by a beam splitter of the monolithic beam splitter cube member cross over one another and form an interference pattern;
passing incident light through a light source converter disposed in an optical input path of the monolithic beam splitter cube member to generate interferogram light output from the monolithic beam splitter cube member.

17. The method of claim 16, wherein the wedge angles $\alpha_1$ and $\alpha_2$ comprise a same wedge angle $\alpha$ such that the at least two reflective wedge surfaces are each tilted by the same wedge angle $\alpha$.

18. The method of claim 16, further comprising:
capturing the interferogram light output from the monolithic beam splitter cube member.

19. The method of claim 18, wherein the capturing the interferogram light output comprises:
controlling a light detector to capture an interferogram image.

20. The method of claim 19, wherein the light detector comprises a color imaging device.

21. The method of claim 19, wherein the light detector comprises a monochrome imaging device.

22. The method of claim 19, wherein beams of light provided by the first and second reflective wedge surfaces reach predefined pixels of the light detector with zero optical path difference in a field of view to thereby secure interference fringes of broadband light sources.

23. The method of claim 18, wherein the monolithic beam splitter cube member, the light source converter, and a light detector are disposed in a mobile electronic device in an embedded form factor.

24. The method of claim 16, wherein interference fringes of the interferogram light align vertically in a field of view of a light detector used in capturing the interferogram light output.

25. The method of claim 16, wherein interference fringes of the interferogram light align horizontally in a field of view of a light detector used in capturing the interferogram light output.

26. The method of claim 16, wherein interference fringes of the interferograms align diagonally in a field of view of a light detector used in the capturing the interferogram light output.

27. The method of claim 16, further comprising:
attaching an external accessory comprising the monolithic beam splitter cube member and the light source converter to a host processor-based system forming a static Fourier transform interferometer (SFTI) compact spectrometer.

28. The method of claim 27, wherein the host processor-based system is selected from the group consisting of a digital camera, a smartphone, a personal digital assistant (PDA), a tablet device, and a personal computer.

29. The method of claim 27, wherein the attaching the external accessory to the host processor-based system comprises disposing the monolithic beam splitter cube member in juxtaposition with a light detector of the host processor-based system.

30. The method of claim 29, further comprising:
outputting the interferogram light through a lens disposed in an optical path between the monolithic beam splitter cube member and the light detector.

31. The method of claim 27, wherein the external accessory further comprises a light detector and a data interface, and wherein the attaching the external accessory to the host processor-based system comprises coupling the external accessory to a data interface of the host processor-based system via the data interface of the external accessory.

32. A static Fourier transform interferometer (SFTI) compact spectrometer system, the system comprising:
a beam splitter cube member having at least two reflective wedge surfaces, wherein a first and second reflective wedge surface of the at least two reflective wedge surfaces having adjacent edges are tilted away from orthogonal directions by non-zero wedge angles $\alpha_1$ and $\alpha_2$ respectively so that beams of light provided by a beam splitter of the beam splitter cube member cross over one another and form an interference pattern;
a light source converter disposed in an optical input path of the beam splitter cube member;
a light detector disposed in an optical output path of the beam splitter cube member, wherein the light detector is configured to capture interferogram light output by the beam splitter cube member through a lens and provide an interferogram image; and
interferogram transform processing logic configured transform the interferogram image to corresponding spectrum data.

33. The system of claim 32, wherein the beam splitter cube member comprises a monolithic structure.

34. The system of claim 32, wherein the wedge angles $\alpha_1$ and $\alpha_2$ comprise a same wedge angle $\alpha$ such that the at least two reflective wedge surfaces are each tilted by the same wedge angle $\alpha$.

35. The system of claim 32, wherein interference fringes of the interferogram image align vertically in a field of view of the light detector.

36. The system of claim 32, wherein interference fringes of the interferogram image align horizontally in a field of view of the light detector.

37. The system of claim 32, wherein interference fringes of the interferogram image align diagonally in a field of view of the light detector.

38. The system of claim 32, wherein the beam splitter cube member and the light source converter are disposed in an external accessory form factor, wherein the interferogram transform processing logic is disposed in a host processor-based system, and wherein the external accessory is configured to cooperate with the host processor-based system and form the SFTI compact spectrometer.

39. The system of claim 38, wherein the host processor-based system is selected from the group consisting of a digital camera, a smartphone, a personal digital assistant (PDA), a tablet device, and a personal computer.

40. The system of claim 38, wherein the light detector is disposed in the host processor-based system, and wherein the external accessory is configured to attach to the host processor-based system in juxtaposition with the light detector of the host processor-based system.

41. The system of claim 40, further comprising:
a lens disposed in an optical output path of the beam splitter cube member, wherein the lens is disposed in an optical path between the beam splitter cube member and the light detector.

42. The system of claim 38, wherein the light detector is disposed in the external accessory form factor, and wherein the external accessory is configured to attach to the host processor-based system via a data interface.

43. The system of claim 32, wherein the beam splitter cube member, the light source converter, the light detector, and the interferogram transform processing logic are disposed in a mobile electronic device in an embedded form factor.

* * * * *

UNITED STATES PATENT AND TRADEMARK OFFICE
CERTIFICATE OF CORRECTION

Page 1 of 1

PATENT NO. : 10,830,641 B2
APPLICATION NO. : 16/037855
DATED : November 10, 2020
INVENTOR(S) : Jiangquan Mai et al.

It is certified that error appears in the above-identified patent and that said Letters Patent is hereby corrected as shown below:

In the Claims

Column 16, Claim 16, Line 25, delete "the system method comprising" and replace with --the method comprising--.

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*